(12) United States Patent
Medlen et al.

(10) Patent No.: US 10,750,015 B2
(45) Date of Patent: Aug. 18, 2020

(54) AUTHENTICATING WITH A SERVICE PROVIDER USING A VIRTUAL ASSISTANT DEVICE

(71) Applicant: PAYPAL, INC., San Jose, CA (US)

(72) Inventors: Jiri Medlen, Fullerton, CA (US); Anush Vishwanath, Santa Clara, CA (US); Braden Christopher Ericson, San Jose, CA (US); Michael Charles Todasco, Santa Clara, CA (US); Cheng Tian, San Jose, CA (US); Gautam Madaan, San Jose, CA (US); Titus Woo, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 99 days.

(21) Appl. No.: 15/710,538

(22) Filed: Sep. 20, 2017

(65) Prior Publication Data

US 2019/0089831 A1 Mar. 21, 2019

(51) Int. Cl.
*G10L 15/07* (2013.01)
*H04M 3/493* (2006.01)
(Continued)

(52) U.S. Cl.
CPC .......... *H04M 3/4936* (2013.01); *G06F 40/40* (2020.01); *G10L 13/00* (2013.01); *G10L 15/07* (2013.01);
(Continued)

(58) Field of Classification Search
CPC .......... G06F 21/32; G06F 21/31; G06F 21/36; G06F 21/42; G06F 21/45; G06F 2221/2113; G06F 21/577; G06F 2221/2111; G06F 2221/2115; G06F 3/0608; G06F 3/0647; G06F 3/0683; G06F 17/28; G06F 40/40; H04L 63/0861; H04L 63/08; H04L 63/083; H04L 63/0838; H04L 63/0853; H04L 63/0876; H04L 63/105; H04L 63/108; H04L 2463/102; H04L 9/0822; H04L 9/3231; H04L 2209/805; H04L 63/0492; H04L 63/20; H04L 9/0819; H04L 9/0825; H04L 9/0833; H04L 9/0841;
(Continued)

(56) References Cited

U.S. PATENT DOCUMENTS

7,555,776 B1 * 6/2009 Lymer ..................... G06F 21/56
726/22
9,432,361 B2 * 8/2016 Mahaffey ............ H04L 63/0853
(Continued)

*Primary Examiner* — Abdelali Serrou
(74) *Attorney, Agent, or Firm* — Haynes and Boone, LLP (57) ABSTRACT

A virtual assistant device is configured to perform operations that include receiving a user request of a user to use a service provided by a service provider, and based on an identifier associated with the service provider, determining a set of authentication credential types that the service provider accepts for authentication. The operations also include determining, based on sensor information collected from one or more hardware sensors, whether one or more other people besides the user are within a proximity to the device. Further, the operations include based on a calculated risk security level, selecting a first authentication credential type from the set of authentication credential types and selecting a first communication mode from a set of communication modes.

20 Claims, 5 Drawing Sheets

(51) Int. Cl.
*G10L 15/26* (2006.01)
*G10L 13/00* (2006.01)
*H04M 3/527* (2006.01)
*G06F 40/40* (2020.01)
*G10L 15/22* (2006.01)
*G10L 25/21* (2013.01)

(52) U.S. Cl.
CPC ............ *G10L 15/26* (2013.01); *H04M 3/527* (2013.01); *G10L 25/21* (2013.01); *G10L 2015/223* (2013.01)

(58) Field of Classification Search
CPC ....... H04L 9/0894; H04L 9/14; H04L 9/3247; H04L 9/3297; G07F 19/20; G10L 15/25; G10L 17/00; G10L 17/04; G10L 17/06; G10L 17/24; G10L 2015/223; G10L 25/21; G10L 15/26; G10L 15/07; G10L 13/00; H04M 3/527; H04M 3/4936
See application file for complete search history.

(56) References Cited

U.S. PATENT DOCUMENTS

| | | | | |
|---|---|---|---|---|
| 9,654,477 | B1* | 5/2017 | Kotamraju | H04L 63/102 |
| 9,792,434 | B1* | 10/2017 | Li | G06F 21/554 |
| 2007/0127453 | A1* | 6/2007 | Shibata | H04L 29/06027 |
| | | | | 370/356 |
| 2009/0070594 | A1* | 3/2009 | Kritt | G06F 21/6209 |
| | | | | 713/189 |
| 2009/0089869 | A1* | 4/2009 | Varghese | G06F 21/31 |
| | | | | 726/7 |
| 2012/0246739 | A1* | 9/2012 | Mebed | G06F 21/00 |
| | | | | 726/28 |
| 2012/0254992 | A1* | 10/2012 | Levien | G06F 21/32 |
| | | | | 726/21 |
| 2014/0189784 | A1* | 7/2014 | Marino | G06F 21/60 |
| | | | | 726/1 |
| 2014/0259138 | A1* | 9/2014 | Fu | H04L 63/083 |
| | | | | 726/7 |
| 2015/0186892 | A1* | 7/2015 | Zhang | G06Q 20/40145 |
| | | | | 705/44 |
| 2015/0269946 | A1* | 9/2015 | Jones | G10L 17/22 |
| | | | | 704/273 |
| 2015/0371026 | A1* | 12/2015 | Gnanasekaran | G06F 21/35 |
| | | | | 726/7 |
| 2015/0371098 | A1* | 12/2015 | Ishii | G06K 9/00892 |
| | | | | 382/115 |
| 2016/0034685 | A1* | 2/2016 | Hockings | G06F 21/46 |
| | | | | 726/6 |
| 2016/0065568 | A1* | 3/2016 | Dave | H04L 63/0853 |
| | | | | 726/4 |
| 2016/0261532 | A1* | 9/2016 | Garbin | H04M 1/72547 |
| 2016/0292408 | A1* | 10/2016 | Zhang | G06F 21/32 |
| 2016/0337863 | A1* | 11/2016 | Robinson | H04W 12/08 |
| 2017/0039010 | A1* | 2/2017 | Nobutani | G06F 21/32 |
| 2017/0372055 | A1* | 12/2017 | Robinson | H04W 12/06 |
| 2018/0039990 | A1* | 2/2018 | Lindemann | G06F 21/31 |

* cited by examiner

AUTHENTICATING WITH A SERVICE PROVIDER USING A VIRTUAL ASSISTANT DEVICE

BACKGROUND

Virtual assistant devices have become increasingly popular in today's households. Such devices may typically receive a user query in the form of a voice communication and attempt to perform an action in response to the query via a connection to the Internet. In some cases, virtual assistant devices may be configured to communicate with one or more service providers to perform the requested action. As such, the virtual assistant devices may need to authenticate the user with one or more service providers.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Systems and methods are provided for authenticating with a service provider using a virtual assistant device. According to certain embodiments, a virtual assistant device may be located in a particular area, such as a room of a residence or other type of building. The virtual assistance device may be configured to receive voice commands from one or more users to perform certain actions, such as to perform a certain action using a service of a service provider. For instance, such service may include, but are not limited to, playback of media, search queries, shopping, facilitating payments, and requesting car services such as from a ridesharing application. To this end, the virtual assistant device may be configured to communicate with one or more service provider servers associated with the various service providers.

According to certain embodiments, a user may request the virtual assistant device to perform an action or task. For example, the user may issue a voice command, and the virtual assistant device may identify the action or task associated with the voice command. More particularly, the virtual assistant device may receive the voice command and execute a speech recognition algorithm to determine the words being spoken, and in some cases, the identity of the speaker/user. The virtual assistant device may then map the determined words to a particular service of a service provider. In order to facilitate the service, the user may need to be authenticated with the service provider, and in some cases, in real-time. To this end, the virtual assistant device may be configured to request and/or receive authentication credentials associated with the user and provide the authentication credentials to a service provider server of the service provider.

In some implementations, a plurality authentication credential types may be available for authenticating with the service provider server. In other words, the service provider server may accept different types of authentication credentials of the user to authenticate the user. For instance, the user may authenticate with the service provider server using one or more of a username/password combination, a personal identification number (PIN), a social security number, a driver's license number, a financial account number, a security question, and/or the like. It will be appreciated that the above list of authentication credential types is not exhaustive and that authentication credential types are also contemplated within the present disclosure.

Furthermore, the virtual assistant device may be configured to receive authentication credentials from the user using different communication modes. For example, the virtual assistant device may receive the authentication credentials from the user via voice communication, text messaging, instant messaging, electronic mail, near-field communication (NFC), Bluetooth, and/or other types of wireless technology.

According to a particular embodiment, in response to the user request to initiate the service by the service provider, the virtual assistant device may be configured to determine a number of people (that are not the user) that are located within a proximity (e.g., a predetermined distance) to the virtual assistant device. For example, the virtual assistant device may use wireless communication to output a broadcast signal (e.g., via Wi-Fi, Bluetooth, NFC, ultrasound, and/or other types of wireless communication) and determine the number of people based on the number of responses to the broadcast signal. As another example, the virtual assistant device may activate a microphone to detect ambient noise (e.g., noise that is not the user's voice) and determine whether or not the user is alone in proximity to the virtual assistant device based on the amount of ambient noise detected. In yet another example, the virtual assistant device may include a camera and/or other type of image sensing device to identify whether other people than the user are in proximity to the virtual assistant device. It will be appreciated that the virtual assistant device may include various other types of sensors to sense the presence of people other than the user that are in proximity to the virtual assistant device.

Based on the number of people determined by the virtual assistant device, the virtual assistant device may be configured to calculate a security risk level of an environment of the user. The security risk level of the environment may be directly proportional to the number of people determined. For example, the greater the determined number of people, the greater the security risk level of the environment and vice versa. In some embodiments, the virtual assistant device may calculate the security risk level of the environment based on additional factors, such as respective identities of any people detected within the proximity to the virtual assistant device, a time of day, location information of the virtual assistant device, operations of a user device of the user, and/or other factors.

Furthermore, based on the calculated security risk level of the environment of the user, the virtual assistant device may select a first authentication type from the plurality of authentication types and a first communication mode from the different communication modes. The virtual assistant device may then output a request for the user to provide authentication credentials of the first authentication type and output an indication that the first communication mode is available to the user for providing the authentication credentials to the CAD. For instance, if the virtual assistant device determines that there are no other people within a proximity to the virtual assistant device (e.g., the user is the only person detected by the virtual assistant device), the virtual assistant device may request relatively more sensitive authentication credentials, such as a social security number, credit card number, and/or the like. Further, the virtual assistant device may indicate that the relatively more sensitive authentication credentials may be communicated to the virtual assistant device using voice communication. On the other hand, if the virtual assistant device detects that other people besides the user are located within the proximity to the virtual assistant device, the virtual assistant device may request relatively less sensitive authentication credentials from the user, a greater quantity of the relatively less sensitive authentication credentials, for the authentication credentials to be communicated over a relatively more secure communication mode (e.g., Bluetooth pairing, text message, etc.), and/or a combination of thereof.

In yet other embodiments, the virtual assistant device may calculate the security risk level of the user's environment based on web browsing information corresponding to the user device of the user. For example, the virtual assistant device may use the web browsing information to identify a webpage that is currently being browsed by the user device. The virtual assistant device may further determine a security level of the webpage, which may affect the security risk level of the user's environment. In some implementations, if the security level of the webpage fails to satisfy a webpage security level threshold, the virtual assistant device may cause one or more light bulbs in a room of building in which the user is located to emit a particular color of light.

Figure 1:
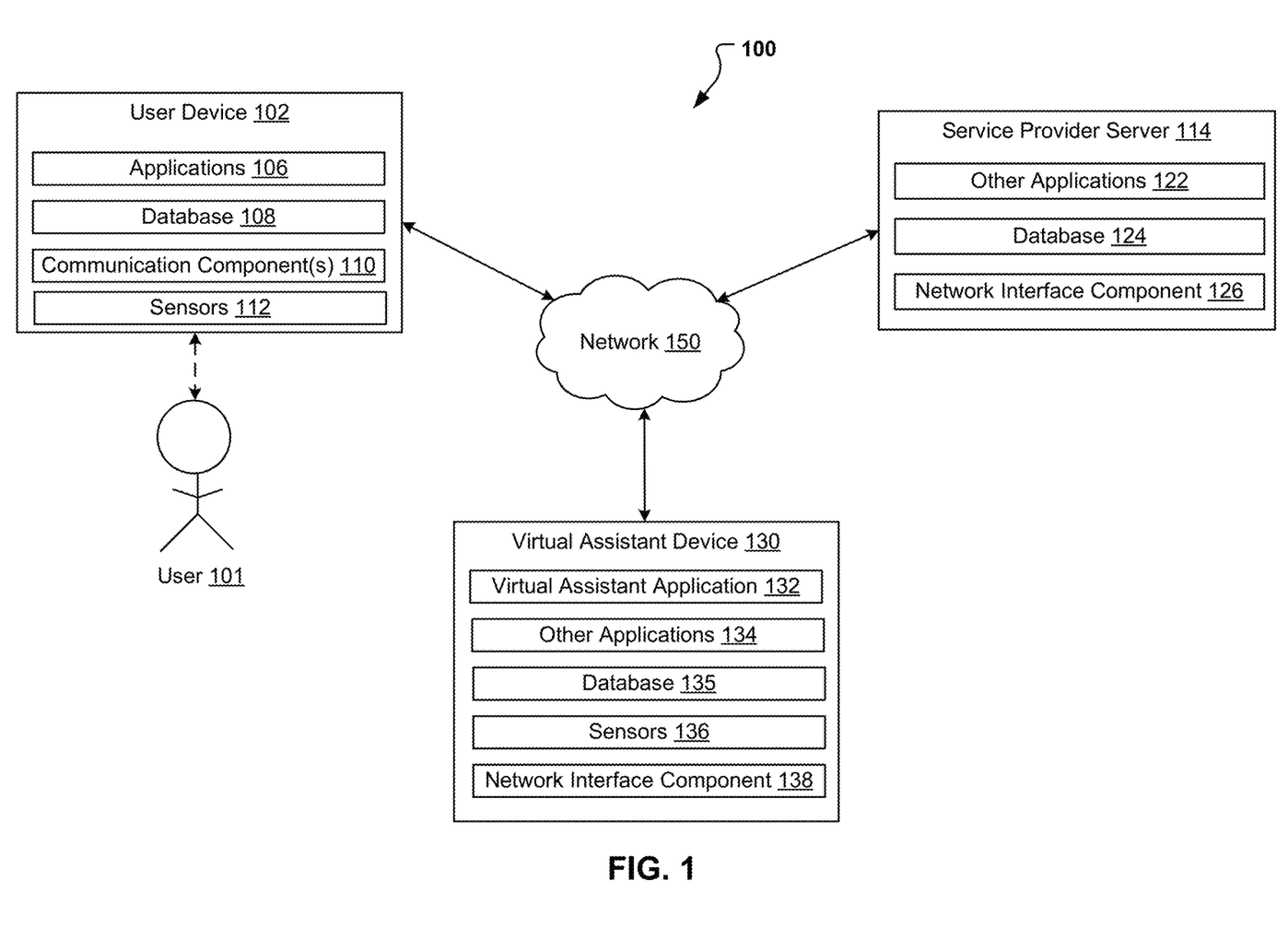
FIG. 1 is a block diagram of a networked system suitable for implementing the processes described herein for authenticating with a service provider using a virtual assistant device.

FIG. 1 is a block diagram of a networked system 100 for implementing the processes described herein, according to an embodiment. As shown, system 100 may include or implement a plurality of devices, computers, servers, and/or software components that operate to perform various methodologies in accordance with the described embodiments. Example devices, computers, and servers may include mobile devices, wearable devices, stand-alone devices, desktop computers, laptop computers, and enterprise-class servers, executing an operating system (OS) such as a MICROSOFT® OS, a UNIX® OS, a LINUX® OS, or another suitable device and/or server based OS. It will be appreciated that the devices, computers, and/or servers illustrated in FIG. 1 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 100 includes a user device 102 configured to interface with a user, a service provider server 114, and a virtual assistant device 130, which may be in communication with each other over a network 150. The user device 102, the service provider server 114, and the virtual assistant device 130 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 100, and/or accessible over network 150.

The user device 102 may be implemented as a communication device that may utilize appropriate hardware and software configured for wired and/or wireless communication with the service provider server 114 and/or the virtual assistant device 130.

The user device 102 may include applications 106, a database 108, communication components 110, and sensors 112. The applications 106 may correspond to executable processes, procedures, and/or applications with associated hardware. In other embodiments, user device 102 may include additional or different components having specialized hardware and/or software to perform operations associated with the applications 106.

The user device 102 may execute the applications 106 to perform various other tasks and/or operations corresponding to the user device 102. For example, the applications 106 may include security applications for implementing client-side security features, programmatic client applications for interfacing with appropriate application programming interfaces (APIs) over network 150 and/or payment network 160, or other types of applications. The applications 106 may also include additional communication applications, such as email, texting, voice, and instant messaging (IM) applications that enable a user to send and receive emails, calls, texts, and other notifications through the network 150. In various embodiments, the applications 106 may include location detection applications, such as a mapping, compass, and/or global positioning system (GPS) applications, which may be used to determine a location of the user device 102. The other applications 106 may include social networking applications. Additionally, the applications 106 may include device interfaces and other display modules that may receive input and/or output information. For example, the applications 106 may include a graphical (GUI) configured to provide an interface to the user.

The user device 102 may further include a database 108, which may be stored in a memory and/or other storage device of the user device 102. The database 108 may include, for example, identifiers (IDs) such as operating system registry entries, cookies associated with the payment application 104 and/or applications 106, IDs associated with hardware of the communication component 110, IDs used for payment/user/device authentication or identification, and/or other appropriate IDs. The database 108 may also include information corresponding to one or purchase transactions of customers who have purchased goods or services from the merchant, browsing histories of the customers, or other types of customer information. Further, the database 108 may store login credentials, contact information, biometric information, and/or authentication information.

The user device 102 may also include at least one communication component 110 configured to communicate with various other devices such as the virtual assistant device 130 and/or the service provider server 114. In various embodiments, communication component 110 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth, Bluetooth low-energy, near field communication (NFC) devices, and/or the like.

The user device 102 may also include one or more hardware sensors 112 to determine user inputs from the consumer, motion of the user device 102, biometric information associated with the consumer or authorized users of the user device 102, and/or various environmental data associated with the user device 102. The sensors 112 may include, but are not limited to, gyroscopes, cameras, microphones, accelerometers, barometers, thermometers, compasses, magnetometers, light detectors, proximity sensors, fingerprint sensors, pedometers, and heart rate monitors.

The service provider server 114 may be maintained, for example, by a service provider, which may provide various services. In one example, the service provider server 114 may be provided by PAYPAL, Inc. of San Jose, Calif., USA and provide various payment processing services. However, in other embodiments, the service provider server 114 may be maintained by or include a financial service provider, social networking service, email or messaging service, media sharing service, and/or other service provider.

The service provider server 114 may execute the applications 122 to perform various other tasks and/or operations corresponding to the service provider server and/or the user device 102. For example, the applications 122 may include security applications for implementing server-side security features, programmatic client applications for interfacing with appropriate application programming interfaces (APIs) over network 150, or other types of applications. The applications 122 may also include additional communication applications, such as email, texting, voice, and instant messaging (IM) applications that enable a user to send and receive emails, calls, texts, and other notifications through the network 150. In various embodiments, the applications 122 may include location detection applications, such as a mapping, compass, and/or global positioning system (GPS) applications, which may be used to determine a location of the user device 102. The other applications 122 may include social networking applications. Additionally, the applications 122 may include device interfaces and other display modules that may receive input and/or output information. For example, the applications 122 may include a GUI configured to provide an interface to the user.

The service provider server 114 may further include a database 124, which may be stored in a memory and/or other storage device of the service provider server 114. The database 124 may include, for example, IDs such as operating system registry entries, cookies associated with the payment processing application 136, biometric information, IDs associated with hardware of the network interface component 126, IDs used for payment/user/device authentication or identification, and/or other appropriate IDs. According to a particular embodiment, the database 108 may also store a merchant identifier associated with the merchant, a location identifier associated with the merchant location, and/or a POS identifier associated with the user device 102.

In various embodiments, the service provider server 114 also includes at least one network interface component 126 that is configured to communicate with the user device 102, POS device 140, and/or virtual assistant device 130 via the network 150 and/or the payment network 160. The network interface component 126 may comprise a DSL modem, an Ethernet device, a broadband device, a satellite device and/or various other types of wired and/or wireless network communication devices including microwave, RF, and IR communication devices.

The virtual assistant device 130 may be maintained, for example, by a merchant and may be in communication with the service provider server 114, which may provide payment processing services for the merchant. However, in other embodiments, the virtual assistant device 130 may be maintained by or include a financial service provider, social networking service, email or messaging service, media sharing service, and/or other service provider, which may provide payment processing services.

The virtual assistant device 130 includes a virtual assistant application 132, which the virtual assistant device 130 may execute to assist with various queries and tasks requested by the user 101. For example, the virtual assistant application 132 may be configured to receive voice input/communication from the user 101, and to determine specific requests of the user based on the voice communication. For example, the virtual assistant application 132 may execute various speech recognition algorithms (e.g., acoustic modeling, language modeling, natural language processing, Hidden Markov models, and/or the like) with respect to the voice communication to identify a requested service that the user 101 is requesting to be performed. The virtual assistant application 132 may also determine an identity of the user 101, such as by comparing the received voice communication with a previously stored sample of the user's 101 voice.

According to certain embodiments, the virtual assistant application 132 may also determine a service provider to perform the requested service. For example, the user 101 may have previously indicated that certain service providers are to perform certain tasks and/or services. In some cases, the database 135 may store mappings and/or association between respective services and corresponding service providers to perform those services. For example, if the requested service is to conduct a payment transaction, a corresponding payment service provider may be determined by the virtual assistant application 132. As another example, if the requested service is to play music, a corresponding music service provider may be determined by the virtual assistant application 132. In yet another example, if the requested service is to find transportation to a particular destination, a corresponding ride-sharing service provider may be determined by the virtual assistant application 132. It will be appreciated that various other types of requested services and corresponding service providers may be identified by the virtual assistant application 132.

Based on the requested service, the virtual assistant application 132 may communicate with the service provider server 114 of the corresponding determine service provider to cause the service provider server 114 to perform the requested service. According to a particular embodiment, in order for the service provider server 114 to perform the requested service, the user 101 may need to be authenticated with the service provider server 114. Further, the service provider server 114 may store a set of authentication credentials corresponding to different authentication credential types that can be used to authenticate the user 101 with the service provider server 114. For example, the user 101 may have previously registered with the service provider server 114 and provided the set of authentication credentials to the service provider server.

The virtual assistant application 132 may also be configured to calculate a security risk level of an environment of the user 101. In certain implementations, the virtual assistant application 132 may calculate the security risk level based on determining a number of people (not including the user 101) located within a proximity to the virtual assistant device 130. For example, the security risk level may be directly proportional to the number of people detected by the virtual assistant application 132 such that the greater the number of people detected, the greater the calculated security risk level and vice versa.

Moreover, the virtual assistant application 132 may use various methods to detect the number of people. For instance, the virtual assistant application 132 may output a wireless broadcast signal, such as via the network interface component 138, and determine the number of people based on a number of receive response signals to the broadcast signal. As another example, the virtual assistant application 132 may activate a microphone included in the virtual assistant device 130 to detect ambient noise (e.g., noise that is not the user's voice) and determine whether or not the user is alone in proximity to the virtual assistant device based on the amount of ambient noise detected. As another example, the virtual assistant device may include a camera and/or other type of image sensing device to identify whether other people than the user 101 are in proximity to the virtual assistant device. It will be appreciated that the virtual assistant device may include various other types of sensors to sense the presence of other people than the user 101 that are in proximity to the virtual assistant device.

In yet other examples, the virtual assistant application 132 may also detect the number of people via various other devices that are connected to the network 150. For example, the virtual assistant application 132 may be configured to monitor network traffic through the network 150, other sensors connected to the network 150, security cameras, and/or the like.

In embodiments where the virtual assistant application 132 detects a user device 102 corresponding to the user 101, the virtual assistant application 132 may also be configured to calculate the security risk level of the environment of the user 101 based on a webpage being browsed by the user device 102. For instance, the virtual assistant device may communicate with the user device 102 to access webpage information being browsed by a browser stored on the user device 102. Based on the webpage information, the virtual assistant application 132 may determine a webpage security level associated with webpage. In another embodiment, the browser may determine the webpage security level and may provide the webpage security level to the virtual assistant application 132. For example, a webpage that uses Hyper Text Transfer Protocol Secure may correspond to a secure webpage, and a webpage that uses ordinary Hyper Text Transfer Protocol may correspond to an insecure webpage. A secure webpage may correspond to a greater security risk level of the environment calculated by the virtual assistant application 132 while an insecure webpage may correspond to a lower security risk level calculated by the virtual assistant application 132.

In other embodiments where the user device 102 is detected, the virtual assistant application 132 the calculated security risk level may further be based on a list of known malicious actors (e.g., server hosts, webpages, or websites). For example, the service provider server 114 may store the list of known malicious actors, which may be accessed by the virtual assistant application 132. In certain instances, a browser executed by the user device 102 may be configured to monitor downloaded files by the user device 102 to detect security risks associated with the downloaded files. If the browser detects a security risk, the browser may cause the user device 102 to transmit a notification to the virtual assistant device 130 of the security risk. The security risk associated with the downloaded application may affect the calculated security risk level by the virtual assistant application 132 (e.g., causing the calculated security risk level to increase).

Based on the calculated security risk level, the virtual assistant application 132 may determine and/or select one or more of the authentication credential types accepted by the service provider to request from the user 101. In some implementations, the number of authentication credential types and respective information sensitivity levels of the authentication credential types may also depend on the calculated security risk. Further, based on the calculated security risk level, the virtual assistant application 132 may also determine and/or select one or more communication modes, from a total set of communication modes, to make available for the user to provide authentication credentials corresponding to the selected authentication credential type(s). Communication modes may include, but are not limited to, voice communication, text messaging, instant messaging, electronic mail, near-field communication (NFC), Bluetooth, and/or communication using types of wireless technology.

In response to determining and/or selecting the authentication credential type(s) and the communication mode(s), the virtual assistant application 132 may output a request for the user to provide authentication credentials having the determined authentication credential type(s). The virtual assistant application 132 may also indicate that the determined communication mode(s) are available for the user to communicate the requested authentication credentials. The virtual assistant application 132 may output the request via a speaker included in the virtual assistant device, via a display included in the virtual assistant device, and/or via transmitting the request to the user device 102 (e.g., if the user device 102 is detected and identified by the virtual assistant device to be associated with the user 101). In some cases, the method by which the virtual assistant application 132 outputs the request and indicates the communication mode(s) may also depend on the calculated security risk level.

After receiving the requested authentication credentials from the user 101 and/or the user device 102, the virtual assistant application 132 may be configured to transmit the received authentication credentials to the service provider server 114. The service provider server 114 may then authenticate the user 101 based on the transmitted authentication credentials from the virtual assistant application 132.

According to one or more embodiments, the calculated security risk level may be compared with one or more security risk thresholds. Depending on which of the one or more security risk threshold are satisfied by the calculated security risk level, the virtual assistant application 132 may determine which authentication credential types to request from the user 101 and which communication modes to make available to the user 101 to provide authentication credentials.

Further, in certain embodiments, security thresholds that correspond to greater security risks may take precedence over security thresholds that correspond to lower security risks. For example, a first security risk threshold may correspond to a lower security risk than a second security risk threshold. According to this example, the calculated security risk level may satisfy the first security risk threshold if the virtual assistant application 132 determines that there are no other people besides the user 101 that are located within the proximity to the virtual assistant device 130. As such, the virtual assistant application 132 may output a request for a first set of authentication credential types having relatively high sensitivity (e.g., social security number and/or credit card information) from the user 101. The virtual assistant application 132 may also indicate that all communication modes are available, including voice communication, to the user to provide authentication credentials to the virtual assistant device 130.

On the other hand, the calculated security level may satisfy the second security risk threshold if the virtual assistant application 132 determines that there is at least one person besides the user 101 located within the proximity to the virtual assistant device 130. As such, the virtual assistant application 132 may output a request for a second set of authentication credential types and indicate that only certain communication modes from the total set of communication modes are available to the user 101. For example, voice communication may be unavailable to the user 101 in this scenario because another person might be able to hear the user 101 providing his/her authentication credentials.

In yet other embodiments, the virtual assistant application 132 may be in communication with various light bulbs, such as light bulbs that are located within a same building or structure as the virtual assistant device 130. The light bulbs may be "smart" light bulbs that include wireless transceivers or that otherwise have wireless transceivers attached. As such, the virtual assistant application 132 may communicated with the wireless transceivers of the light bulbs via the network 150. Further, the virtual assistant application 132 may cause the light bulbs to emit different colored light depending on the calculated security risk level. For example, the virtual assistant application 132 may cause the light bulbs to emit different colored light based on the calculated security risk level satisfying the different security risk thresholds.

In still yet other embodiments, the virtual assistant application 132 may cause the light bulbs to emit different colored light based directly on a determined webpage security level of a webpage being browsed by the user device 102. For example, if the virtual assistant application 132 determines that the webpage is insecure, the virtual assistant application 132 may cause one or more of the lights bulbs to emit a first colored light, such as red. On the other hand, if the virtual assistant application 132 determines that the webpage is secure, the virtual assistant application 132 may cause one or more of the light bulbs to emit a second color, such as green.

The virtual assistant device 130 may execute the other applications 134 to perform various other tasks and/or operations corresponding to the service provider server and/or the user device 102. For example, the other applications 134 may include security applications for implementing server-side security features, programmatic client applications for interfacing with appropriate application programming interfaces (APIs) over network 150, or other types of applications. The other applications 134 may also include additional communication applications, such as email, texting, voice, and instant messaging (IM) applications that enable a user to send and receive emails, calls, texts, and other notifications through the network 150. In various embodiments, the other applications 134 may include location detection applications, such as a mapping, compass, and/or global positioning system (GPS) applications, which may be used to determine a location of the user device 102. The other applications 134 may include social networking applications. Additionally, the other applications 134 may include device interfaces and other display modules that may receive input and/or output information. For example, the other applications 144 may include a GUI configured to provide an interface to the user.

The virtual assistant device 130 may further include a database 135, which may be stored in a memory and/or other storage device of the virtual assistant device 130. The database 135 may include, for example, IDs such as operating system registry entries, cookies, biometric information, IDs associated with hardware of the network interface component 148, IDs used for payment/user/device authentication or identification, and/or other appropriate IDs. According to a particular embodiment, the database 135 may also store a merchant identifier associated with the merchant, a location identifier associated with the merchant location, and/or a POS identifier associated with the user device 102.

In various embodiments, the virtual assistant device 130 also includes at least one network interface component 138 that is configured to communicate with the user device 102 and/or the service provider server 114 via the network 150. For example, according to a particular embodiment, the virtual assistant device 130 may receive voice communication information from the user device 102 via the network interface component 148. The network interface component 138 may comprise a DSL modem, an Ethernet device, a broadband device, a satellite device and/or various other types of wired and/or wireless network communication devices including microwave devices, radio frequency devices, infrared devices, Bluetooth devices, Bluetooth low-energy devices, NFC devices, ultrasound devices, and/or the like.

The network 150 may be implemented as a single network or a combination of multiple networks. For example, in various embodiments, the network 150 may include the Internet or one or more intranets, landline networks, wireless networks, and/or other appropriate types of networks. Thus, the network 150 may correspond to small scale communication networks, such as a private or local area network, or a larger scale network, such as a wide area network or the Internet, accessible by the various components of system 100.

Figure 2:
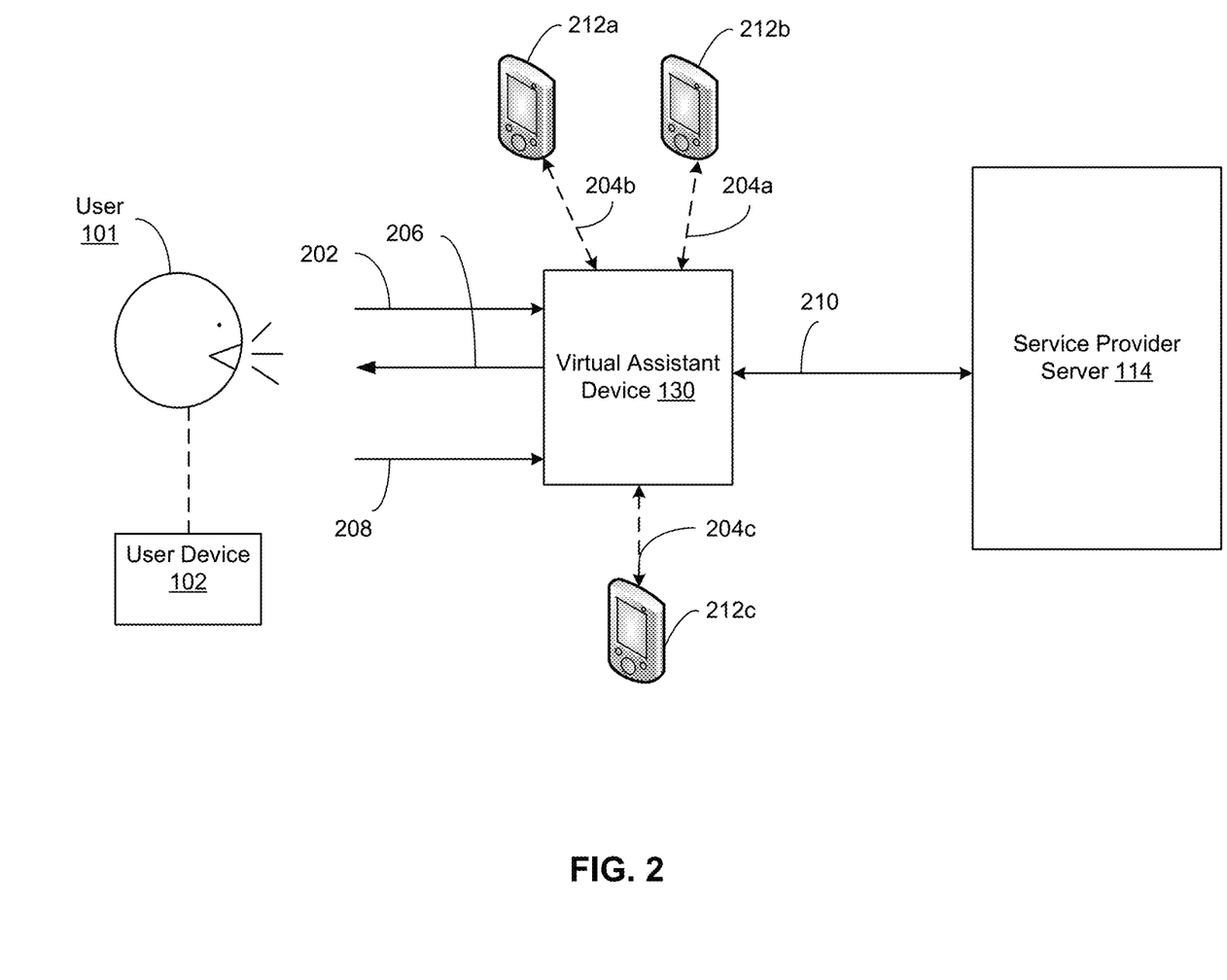
FIG. 2 is an is an example data flow diagram for authenticating with a service provider using a virtual assistant device, according to an embodiment.

FIG. 2 illustrates a data flow diagram 200 for authenticating with a service provider using a virtual assistant device, according certain embodiments. As depicted in FIG. 2, the user 101 may provide a request 202 to the virtual assistant device 130 to use a service provided by a service provider. As previously discussed, the request 202 may be a voice communication from the user 101 or may be transmitted as a wireless communication from the user device 102.

Subsequent to receiving the request 202, the virtual assistant device 130 may be configured to determine a security risk level of an environment of the user 101. The security risk level may be determine based on how many people besides the user 101 that are detected within a predetermined distance to the virtual assistant device 130. The virtual assistant device 130 may attempt to detect other people by transmitting a broadcast signal to determine whether one or more other devices 212*a-c* transmit responses 204*a-c* to the broadcast signal.

Based on the calculated security risk level, the virtual assistant device 130 may determine one or more authentication credential types to request from the user 101 and one or more communication modes that are available to the user to provide authentication credentials. The virtual assistant device 130 may output 306 a request for authentication credentials of the determined authentication credential types and an indication of the determined communication mode(s). Subsequently, the user 101 (and/or the user device 102) may provide the requested authentication credentials 208 using one or more of the determined communication modes. Upon receiving the requested authentication credentials, the virtual assistant device 130 may forward the authentication credentials to the service provider server 114. The service provider server 114 may then authenticate the user 101 with the service provider.

Figure 3:
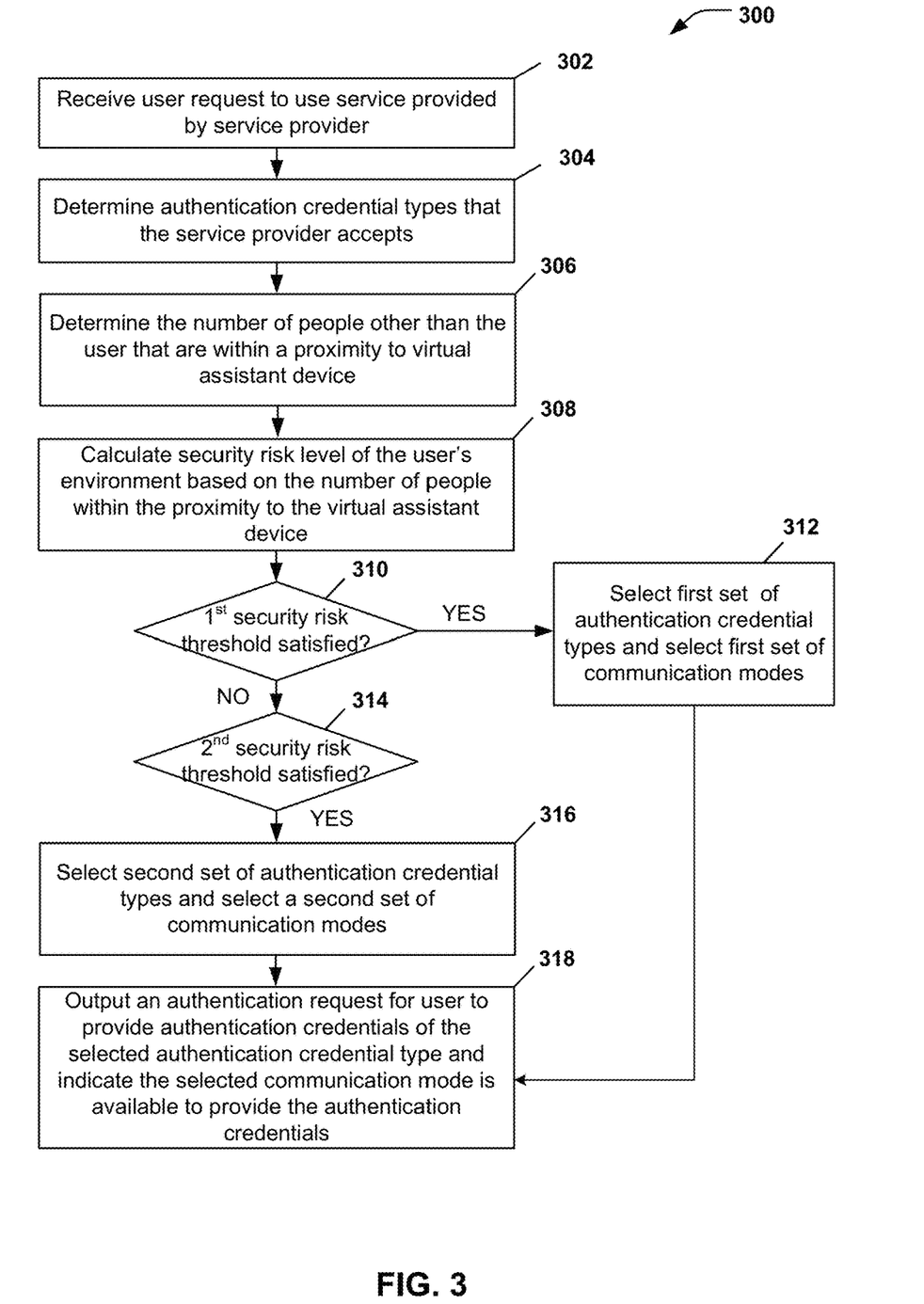
FIG. 3 is an example flow diagram for authenticating with a service provider using a virtual assistant device, according to another embodiment.

FIG. 3 illustrates a flow diagram of a method 300 for authenticating with a service provider using a virtual assistant device, according certain embodiments. Note that one or more steps, processes, and methods described herein may be omitted, performed in a different sequence, or combined as desired or appropriate.

At step 302, the virtual assistant device 130 may receive a user request (e.g., from user 101) to use a service provided by a service provider, such as the service provider corresponding to the service provider server 114. At step 304, the virtual assistant device 130 may determine one or more authentication credential types that the service provider accepts for authentication.

At step 306, the virtual assistant device 130 may determine a number of people other than the user 101 that are within a proximity to the virtual assistant device 130. At step 308, the virtual assistant device 130 may calculate a security risk level of an environment of the user based on the number of people within the proximity to the virtual assistant device 130. At step 310, the virtual assistant device 130 may determine whether the calculated security risk level satisfies a first security risk threshold. If so, at step 312, the virtual assistant device 130 may select a first set of authentication credential types and select a first set of communication modes. From step 312, the method 300 may proceed to step 318, which is described in further detail below.

If the virtual assistant device 130 determines that the calculated security risk level does not satisfy the first security risk threshold, the method 300 may proceed to step 314. At step 314, the virtual assistant device 130 may determine whether the calculated security risk level satisfies a second security risk threshold. If so, the method 300 may proceed to step 316. In a particular embodiment, the second security risk threshold may correspond to a lower security risk than the first security risk threshold. At step 316, the virtual assistant device 130 may select a second set of authentication credential types and a second set of communication modes. The second set of authentication credential types may be different than the first set of authentication credential types, and the second set of communication modes may be different than the first set of communication modes.

At step 318, the virtual assistant device 130 may output an authentication request for the user 101 to provide authentication credentials of the selected set of authentication credential types. Further, the virtual assistant device 130 may indicate that the selected set of communication modes is available for the user 101 to provide the authentication credentials to the virtual assistant device 130.

Figure 4:
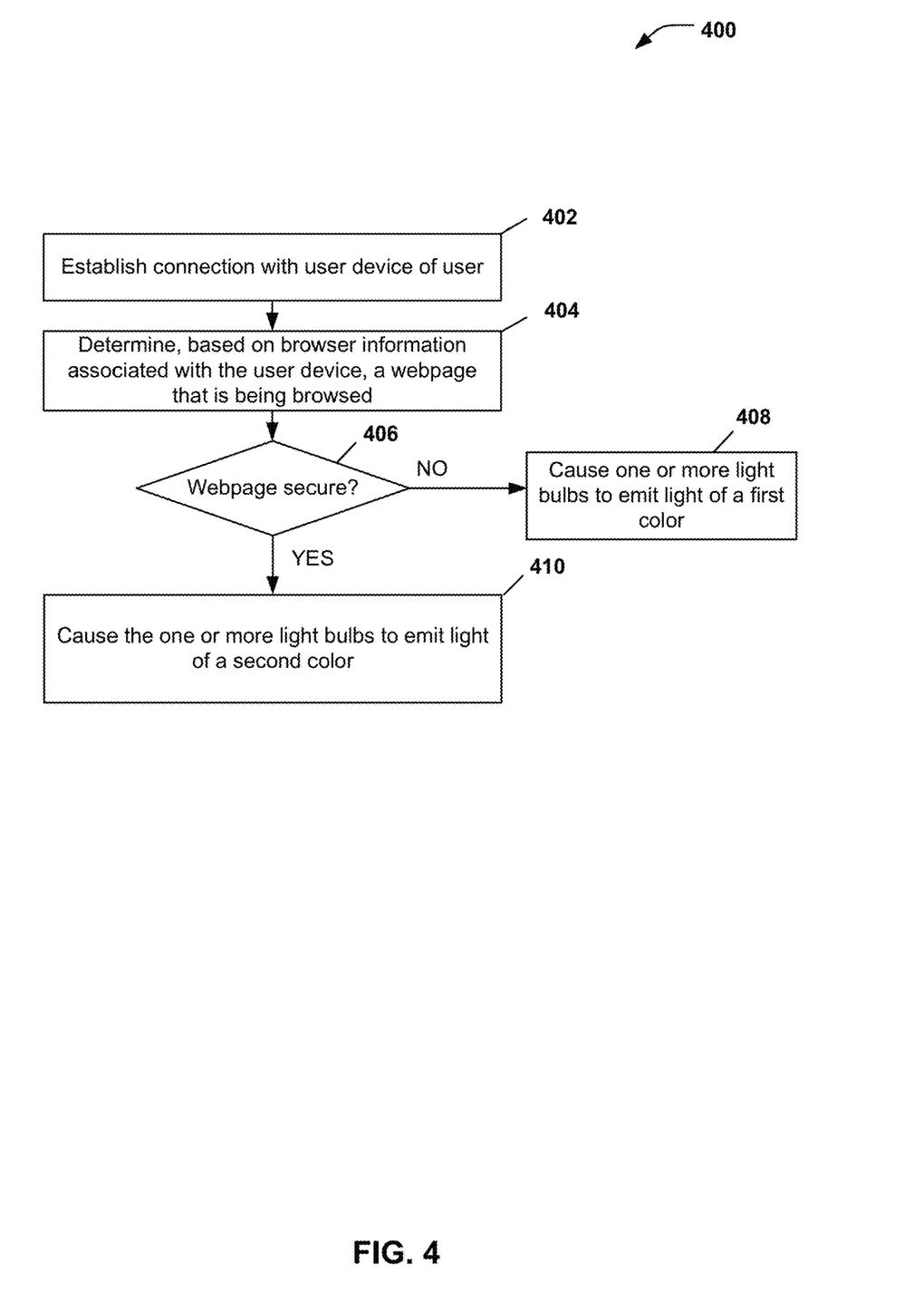
FIG. 4 is an is an example flow diagram for causing light bulbs to emit different colored lights, according to an embodiment.

FIG. 4 illustrates a flow diagram of a method 400 for adjusting light that is emitted from light bulbs that are in communication with the virtual assistant device 130, according to certain embodiments. Note that one or more steps, processes, and methods described herein may be omitted, performed in a different sequence, or combined as desired or appropriate.

At step 402, the virtual assistant device 130 may establish a connection with the user device 102 of the user 101. At step 404, the virtual assistant device 130 may determine, based on browser information stored on the user device 102, a webpage that is being browsed. At step 406, the virtual assistant device 130 may determine whether the webpage is secure. If so, the method 400 may proceed to step 408 where the virtual assistant device 130 causes one or more light bulbs that are in communication with the virtual assistant device 130 to emit light of a first color. If not, the method 400 may proceed to step 410 in which the virtual assistant device 130 causes the one or more light bulbs to emit light of a second color that is different from the first color.

Figure 5:
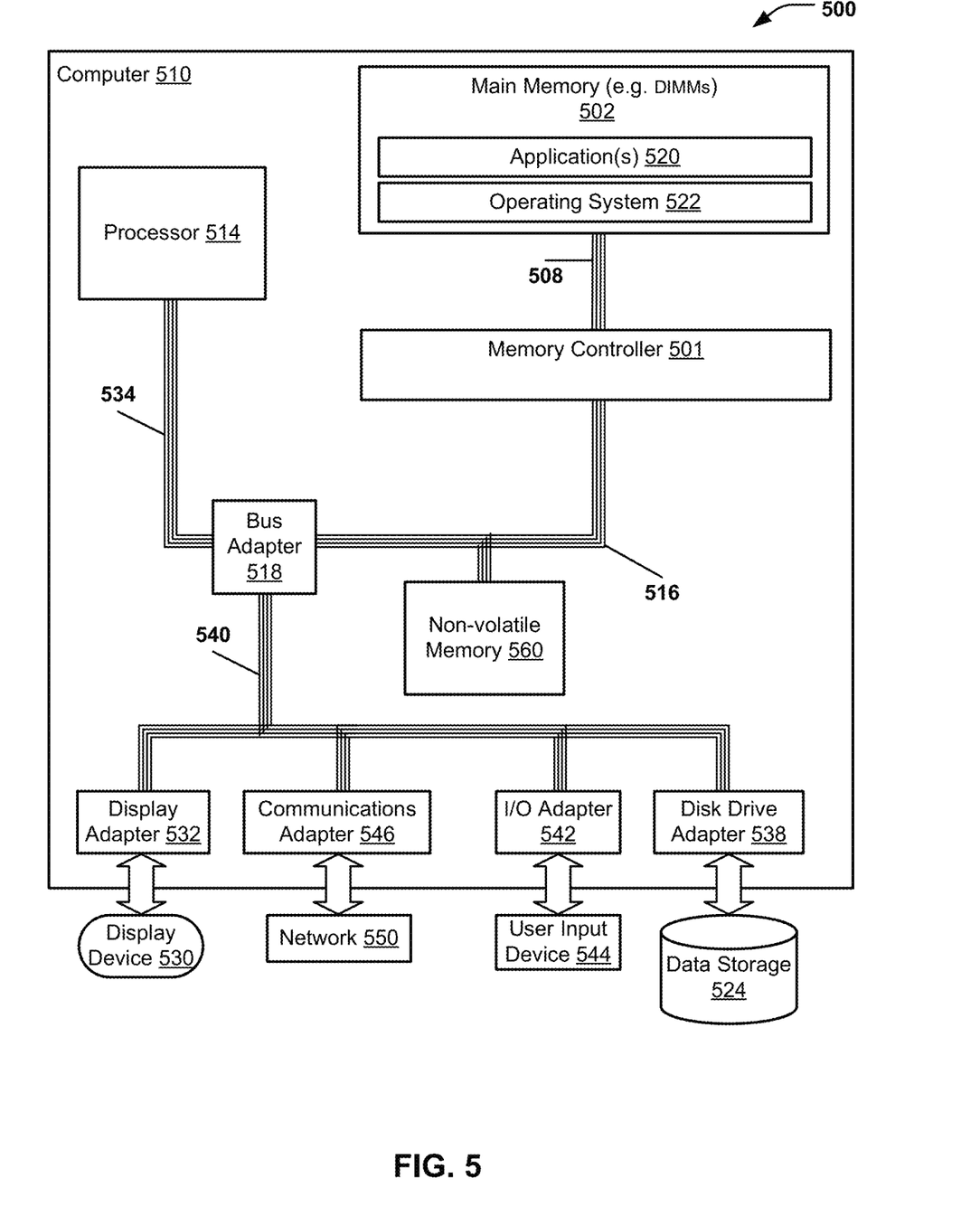
FIG. 5 is a block diagram of a computer system suitable for implementing one or more components in FIG. 1-4, according to an embodiment.

FIG. 5 is a block diagram of a computer system 500 suitable for implementing one or more components in FIG. 1, according to an embodiment. Referring to FIG. 5, an illustrative system 500 including a computer 510 is shown. The computer 510 may be an implementation of a computing system that includes or corresponds to the user device 102, the service provider server 114, and/or the virtual assistant device 130 of FIG. 1. The computer 510 includes at least one computer processor (CPU) 514 (e.g., a hardware processor) as well as main memory 502, a memory controller 501, and a non-volatile memory 560. The main memory 502 is connected through a memory bus 508 to the memory controller 501. The memory controller 501 and the non-volatile memory 560 are connected through a second memory bus 516 and a bus adapter 518 to the processor 514 through a processor bus 534.

Stored at the memory 502 are one or more applications 520 that may be module(s) or computer program instructions for carrying out particular tasks (e.g., the virtual assistant application 132 of FIG. 1). Also stored at the main memory 502 is an operating system 522. Operating systems include, but are not limited to, UNIX® (a registered trademark of The Open Group), Linux® (a registered trademark of Linus Torvalds), Windows® (a registered trademark of Microsoft Corporation, Redmond, Wash., United States), and others as will occur to those of skill in the art. The operating system 522 and the application 520 in the example of FIG. 5 are shown in the main memory 502, but components of the aforementioned software may also, or in addition, be stored at non-volatile memory (e.g., on data storage, such as data storage 524 and/or the non-volatile memory 560).

The computer 510 includes a disk drive adapter 538 coupled through an expansion bus 540 and the bus adapter 518 to the processor 514 and other components of the computer 510. The disk drive adapter 538 connects non-volatile data storage to the computer 510 in the form of the data storage 524 and may be implemented, for example, using Integrated Drive Electronics ("IDE") adapters, Small Computer System Interface ("SCSI") adapters, Serial Attached SCSI ("SAS") adapters, and others as will occur to those of skill in the art. Non-volatile computer memory also may be implemented as an optical disk drive, electrically erasable programmable read-only memory (so-called "EEPROM" or "Flash" memory), RAM drives, and other devices, as will occur to those of skill in the art. In a particular embodiment, the data storage 524 may store the data and information described herein.

The computer 510 also includes one or more input/output ("I/O") adapters 542 that implement user-oriented input/output through, for example, software drivers and computer hardware for controlling input and output to and from user input devices 544, such as keyboards and mice. In addition, the computer 510 includes a communications adapter 546 for data communications with a data communications network 560. The data communications may be carried out serially through Recommended Standard 232 (POS device 140-232) connections (sometimes referred to as "serial" connections), through external buses such as a Universal Serial Bus ("USB"), through data communications networks such as internet protocol (IP) data communications networks, and in other ways as will occur to those of skill in the art. The communications adapter 546 implements the hardware level of data communications through which one computer sends data communications to another computer, directly or through a data communications network. Examples of the communications adapter 546 suitable to use in the computer 510 include, but are not limited to, modems for wired dial-up communications, Ethernet (Institute of Electrical and Electronics Engineers (IEEE) 802.3) adapters for wired network communications, and IEEE 802.11 adapters for wireless network communications. The computer 510 also includes a display adapter 532 that facilitates data communication between the bus adapter 518 and a display device 530, enabling the application 520 to visually present output on the display device 530.

In various embodiments of the present disclosure, execution of instruction sequences to practice the present disclosure may be performed by computer system 500. In various other embodiments of the present disclosure, a plurality of computer systems 500 coupled by communications adapter 546 to the network (e.g., such as a LAN, WLAN, and/or various other wired or wireless networks, including telecommunications, mobile, and cellular phone networks) may perform instruction sequences to practice the present disclosure in coordination with one another.

Particular embodiments described herein may take the form of an entirely hardware embodiment, an entirely software embodiment, or an embodiment containing both hardware and software elements. In a particular embodiment, the disclosed methods are implemented in software that is embedded in processor readable storage medium or storage device and executed by a processor that includes but is not limited to firmware, resident software, microcode, etc.

Further, embodiments of the present disclosure, may take the form of a computer program product accessible from a computer-usable or computer-readable storage device providing program code (e.g., computer-executable instructions) for use by or in connection with a computer, processor, or any instruction execution system. For the purposes of this description, a computer-usable or computer-readable storage device may be non-transitory and can be any apparatus that can tangibly embody a computer program and that can contain, store, communicate, propagate, or transport the program for use by or in connection with the instruction execution system, processor, apparatus, or device.

In various embodiments, the medium can include an electronic, magnetic, optical, electromagnetic, infrared, or semiconductor system (or apparatus or device) or a propagation medium. Examples of a computer-readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (user device 102-R/W) and digital versatile disk (DVD).

A data processing system suitable for storing and/or executing program code may include at least one processor coupled directly or indirectly to memory elements through a system bus. The memory elements can include local memory employed during actual execution of the program code, bulk storage, and cache memories that may provide temporary or more permanent storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A virtual assistant device, comprising:
one or more hardware processors; and
a memory storing computer-executable instructions, that in response to execution by the one or more hardware processors, causes the virtual assistant device to perform operations comprising:
    receiving a user request of a user to use a service provided by a service provider;
    receiving, from a mobile application of a mobile device of the user, a notification that a download operation of the mobile application indicates a security risk;
    determining that the download operation is associated with a list of known malicious actors;
    determining a security level of the service provided by the service provider based at least on determining that the download operation is associated with the list of known malicious actors;
    in response to determining that the security level of the service provided by the service provider fails to satisfy a security level threshold, causing one or more lights connected to the virtual assistant device to emit a first color;
    based on an identifier associated with the service provider, determining a set of authentication credential types that the service provider accepts for authentication;
    determining, based on sensor information collected from one or more hardware sensors, whether one or more other people besides the user are within a proximity to the virtual assistant device;
    calculating a security risk level of an environment of the user based on the determining whether the one or more other people are within the proximity to the virtual assistant device;
    based on the calculated security risk level:
        selecting a first authentication credential type from the set of authentication credential types; and
        selecting a first communication mode from a set of communication modes; and
    based on selecting the first authentication credential type and selecting the first communication mode, outputting an authentication request for the user to provide authentication credentials of the first authentication credential type and for the user to provide the authentication credentials using the first communication mode.

2. The virtual assistant device of claim 1, wherein the operations further comprise:
   detecting a voice communication via a microphone included in the one or more hardware sensors; and
   identifying the user based on the voice communication and determining the user request based on the voice communication.

3. The virtual assistant device of claim 1, wherein the determining whether the one or more other people are within the proximity to the virtual assistant device further comprises:
   detecting, via a wireless transceiver included in the one or more hardware sensors, whether one or more communication devices that are not associated with the user are within the proximity to the virtual assistant device.

4. The virtual assistant device of claim 1, wherein the determining whether the one or more other people are within the proximity to the virtual assistant device further comprises:
   determining, via a microphone included in the one or more hardware sensors, whether an ambient noise level satisfies an ambient noise threshold.

5. The virtual assistant device of claim 1, wherein the calculated security risk level is directly proportional to a number of people detected within the proximity to the virtual assistant device.

6. The virtual assistant device of claim 5, wherein the operations further comprise:
   establishing a connection with a device associated with the user,
   determining, through the connection, a webpage being browsed on the device,
   wherein determining the security level of the service provided by the service provider is further based on the webpage being browsed by the device, and wherein the calculating the security risk level further comprises determining that a webpage security level of the webpage fails to satisfy a webpage security level threshold.

7. The virtual assistant device of claim 6, wherein:
causing the one or more lights that are connected to the virtual assistant device to emit the first color is in response to the determining that the webpage security level fails to satisfy the webpage security level threshold, and the one or more lights are wirelessly connected to the virtual assistant device.

8. The virtual assistant device of claim 1, wherein the set of communication modes comprises at least one of voice communication, text message communication, instant message communication, or electronic mail communication.

9. The virtual assistant device of claim 1, wherein the set of authentication credential types comprises at least one of a username and password, a personal identification number, a social security number, a financial account number, or a security question.

10. A method, comprising:
   receiving, by a virtual assistant device comprising one or more hardware processors, a user request of a user to use a service provided by a service provider;
   receiving, from a mobile application of a mobile device of the user, a notification that a download operation of the mobile application indicates a security risk;
   determining that the download operation is associated with a list of known malicious actors;
   determining a security level of the service provided by the service provider based at least on determining that the download operation is associated with the list of known malicious actors;
   determining that the security level fails to satisfy a security level threshold;
   causing one or more lights wirelessly connected to the virtual assistant device to emit a first color;
   based on an identifier associated with the service provider, determining a set of authentication credential types that the service provider accepts for authentication;
   determining, based on sensor information collected from one or more hardware sensors included in the virtual assistant device, whether one or more other people besides the user are within a proximity to the virtual assistant device;
   calculating a security risk level of an environment of the user based on the determining whether the one or more other people are within the proximity to the virtual assistant device;
   based on the calculated security risk level:
      selecting a first authentication credential type from the set of authentication credential types; and
      selecting a first communication mode from a set of communication modes; and
   based on selecting the first authentication credential type and selecting the first communication mode, outputting an authentication request for the user to provide authentication credentials of the first authentication credential type and for the user to provide the authentication credentials using the first communication mode.

11. The method of claim 10, further comprising:
   detecting a voice communication via a microphone included in the one or more hardware sensors; and
   identifying the user based on the voice communication and determining the user request based on the voice communication.

12. The method of claim 10, wherein the determining whether the one or more other people are within the proximity to the virtual assistant device further comprises:
   detecting, via a wireless transceiver included in the one or more hardware sensors, whether one or more communication devices that are not associated with the user are within the proximity to the virtual assistant device.

13. The method of claim 10, wherein the determining whether the one or more other people are within the proximity to the virtual assistant device further comprises:
   determining, via a microphone included in the one or more hardware sensors, whether an ambient noise level satisfies an ambient noise threshold.

14. The method of claim 10, wherein the calculated security risk level is directly proportional to a number of people detected within the proximity to the virtual assistant device.

15. The method of claim 14, further comprising:
   establishing a connection with a device associated with the user,
   determining, through the connection, a webpage being browsed on the device,
   wherein determining the security level of the service provided by the service provider is further based on the webpage being browsed by the device, and wherein the calculating the security risk level further comprises determining that a webpage security level of the webpage fails to satisfy a webpage security level threshold.

16. The method of claim 15, wherein:
causing the one or more lights that are wirelessly connected to the virtual assistant device to emit the first color is in response to the determining that the webpage security level fails to satisfy the webpage security level threshold, and
the one or more lights are wirelessly connected to the virtual assistant device.

17. A non-transitory computer readable medium storing computer-executable instructions, that in response to execution by one or more hardware processors, causes a device to perform operations comprising:
receiving a user request of a user to use a service provided by a service provider;
receiving, from a mobile application of a mobile device of the user, a notification that a download operation of the mobile application indicates a security risk;
determining that the download operation is associated with a list of known malicious actors;
determining a security level of the service provided by the service provider based at least on determining that the download operation is associated with the list of known malicious actors;
in response to determining that the security level of the service provided by the service provider fails to satisfy a security level threshold, causing one or more lights connected to a virtual assistant device to emit a first color;
based on an identifier associated with the service provider, determining a set of authentication credential types that the service provider accepts for authentication;
determining, based on sensor information collected from one or more hardware sensors, whether one or more other people besides the user are within a proximity to the device;
calculating a security risk level of an environment of the user based on the determining whether the one or more other people are within the proximity to the device;
based on the calculated security risk level:
selecting a first authentication credential type from the set of authentication credential types; and
selecting a first communication mode from a set of communication modes; and
based on selecting the first authentication credential type and selecting the first communication mode, outputting an authentication request for the user to provide authentication credentials of the first authentication credential type and for the user to provide the authentication credentials using the first communication mode.

18. The non-transitory computer readable medium of claim 17, wherein the operations further comprise:
detecting a voice communication via a microphone included in the one or more hardware sensors; and
identifying the user based on the voice communication and determining the user request based on the voice communication.

19. The non-transitory computer readable medium of claim 17, wherein the determining whether the one or more other people are within the proximity to the device further comprises:
detecting, via a wireless transceiver included in the one or more hardware sensors, whether one or more communication devices that are not associated with the user are within the proximity to the device.

20. The non-transitory computer readable medium of claim 17, wherein the determining whether the one or more other people are within the proximity to the device further comprises:
determining, via a microphone included in the one or more hardware sensors, whether an ambient noise level satisfies an ambient noise threshold.

* * * * *